Dec. 9, 1941. N. LITCHFIELD 2,265,760
TROLLEY CLIP
Filed Jan. 27, 1941
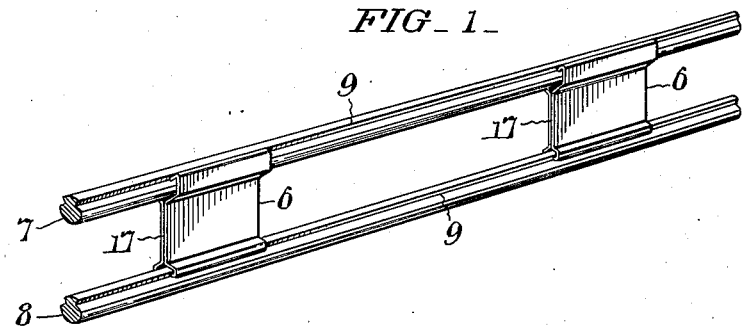
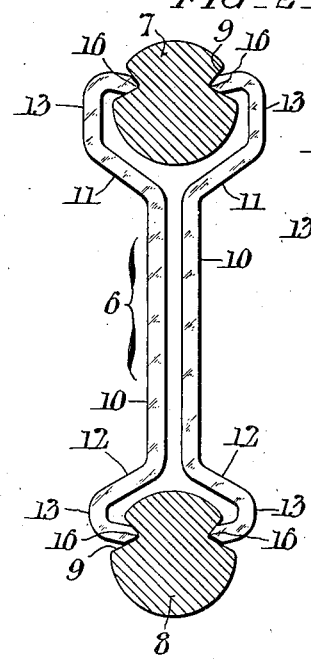
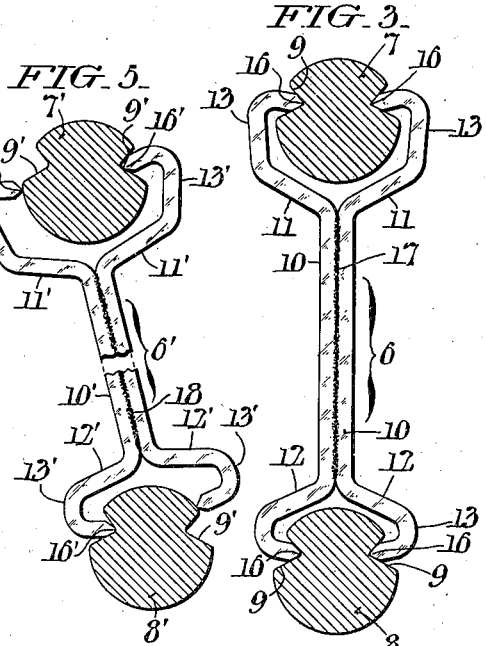
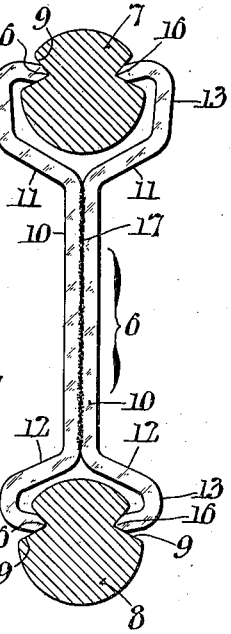
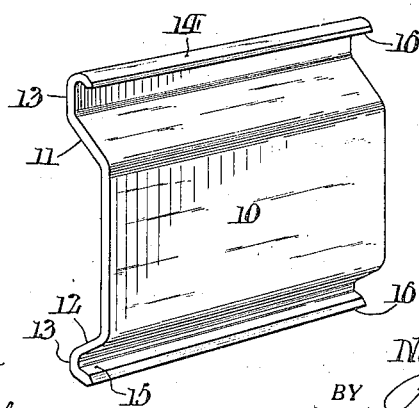
WITNESSES:
Thomas W. Kerr Jr.
George L. Comly
INVENTOR:
Norman Litchfield,
BY Paul Paul
ATTORNEYS.

Patented Dec. 9, 1941

2,265,760

UNITED STATES PATENT OFFICE 2,265,760

TROLLEY CLIP

Norman Litchfield, Pelham Manor, N. Y., assignor to The Pennsylvania Railroad Company, Philadelphia, Pa., a corporation of Pennsylvania Application January 27, 1941, Serial No. 376,059

4 Claims. (Cl. 191—40)

This invention has reference in its broader aspect to suspension devices or clips while it relates, more particularly, to the species designed for supporting current conductive wires, of overhead catenary systems, in electrified railroad and other territories.

Heretofore devices or clips of the referred to species have consisted of sheet or cast metal units, or opposed clamp elements, bolted, brazed, soldered, or riveted, together, with appropriately-shaped upper suspension and lower supporting means, usually in the form of loops and hooks respectively, or vice versa.

Devices or clips of the typified character while measurably effective have a tendency to loosen and permanently lose their holding power on the wires, and it is a primary object of this invention to overcome the noted disadvantage by provision of an improved trolley clip made of material which retains its spring-like qualities and the two halves of which are connected by means which will not loosen.

Another object is to provide an improved trolley clip which can be economically installed in the field.

Another object is to furnish an improved trolley clip capable of quick application and attachment to the current conductive feed and contact wires of electrified catenary systems, with a minimum expenditure of time and labor.

A further object is the provision of a trolley clip comprising opposed members made of high strength corrosion-resistive comparatively-thin pressed metal, and one which is also capable of easy snap-application in the field to spaced feed and contact, electric current conducting wires.

With the foregoing brief introduction of this invention in view, the stated and other objectives are typically comprehended by the means illustrated in the accompanying sheet of drawings, whereon like reference characters designate corresponding parts in all the views, and which will be fully demonstrated as this description thereof progresses; while the concluding claims more particularly define the features of novelty over the prior art.

In the drawing:

Fig. 1 is a fragmentary perspective view of an overhead electric current conductive system including trolley clips in accordance with this invention.

Fig. 2 is an enlarged scale view illustrating the initial step in applying the novel clip, of this invention, to spaced feed and contact wires.

Fig. 3 is a similar view of the clip in service position.

Fig. 4 is a perspective view of one of the clip components; and,

Fig. 5 is a broken view, somewhat similar to Fig. 3, but illustrating a modified form of the invention.

In describing the form of the invention exemplified in the drawing herewith, specific terms will be employed for the sake of clarity, but it is to be understood the scope of said invention is not thereby limited, each such term being intended to embrace all equivalents which perform the same function for an analogous purpose.

Referring more in detail to the drawing, the improved clip of this invention is comprehensively designated by the reference character 6 in Figs. 1-3, inclusive, and in Fig. 5 by the numeral 6' for purposes of differentiation between the two embodiments illustrated. In the form of Figs. 1-4, more specifically, and as adapted for spacially connecting together an electric feed wire 7 and a trolley contacting wire 8 of an overhead catenary system, each such wire is of conventional cross-section having longitudinally extending parallel grooves 9 each subtending an angle of approximately seventy-eight degrees, preferably disposed with twenty-seven degrees below the horizontal and fifty-one degrees above said horizontal. The clip 6 is preferably severed in units, Fig. 4, from suitable high strength corrosion-resistive comparatively-thin pressed or drawn metal stock, of high tensile strength and spring-like qualities, each such unit comprising a substantially rectangular body portion 10 with upper and lower outward, as well as oppositely directed, inclinations 11, 12, respectively, rounding into flat or curved sections 13. The sections 13 have their outer longitudinal portions bent to define grips 14, 15 inclined at a suitable angle respectively above and below the horizontal, with their free edges suitably tapered or of wedge section at 16 for snug engagement in the wire grooves 9, as clearly understandable from Figs. 2 and 3 more particularly.

In use, a pair of the clip units are placed in complementary relation, or with their respective body portions 10 in sufficient separation so that their respective wedge edges 14, 15 engage fork fashion in the feed and contacting wire grooves 9, under a clamped pressure to exert considerable grip on the wires 7, 8. When so applied together in the field, as by a pressure-electrode clamping device, in accordance with known practice, the relatively opposed clip units are fusion united electrically as conventionally indicated at 17, by a time controlled pressure weld, and when the clamping pressure is released it will be obvious that the respective clip portions 11—15 will maintain or exert a constant spring-like grip against the respective wires 7, 8. In other words, the improved clip 6 as described eliminates the use of clamp bolts or rivets and provides a unit of high tensile strength, and which will retain its spring-like qualities almost indefinitely.

Referring now to Fig. 5, the only distinction over the preceding disclosure resides in the fact that the clip 6', therein shown, has been produced in the shop by pressure welding the body portions 10' together at 18, and that said clip is sprung or forced on the respective wires 7, 8 in a manner self-evident to those acquainted with the art and an examination of Fig. 5; accordingly, further explanation herein is deemed unnecessary excepting to note that with this form of the invention the field work is reduced to a simple snap coupling operation readily effectable from a tower car with the minimum expenditure of time, or the use of power operated attaching means. It is further noteworthy that the clip 6 or 6' of this invention is comparatively light in weight and thereby substantially reduces the load on the trolley, and further being of small dimensions it affords maximum clearance from the pantograph in electrified railroads.

Having thus described my invention, I claim:

1. A trolley clip, for electrically and mechanically connecting parallel longitudinally grooved electric current feed and trolley contacting wires, comprising integral complemental units of resilient, comparatively thin, sheet metal; each such unit including a central plane body portion for mutual flat-wise engagement with the corresponding part of the other unit, a substantially uniform jaw portion formed along the upper and lower edges of said body portion and having the free edge portions inwardly bent to corresponding angularity in respect to the horizontal, the opposed jaw portions of said units cooperating for resilient gripping engagement in the grooves of the wires; and means uniting the body portions in abutment.

2. The combination of claim 1 wherein the respective upper and lower edges of the trolley clip complemental units are opposingly and downwardly inclined relative to the horizontal.

3. The combination of claim 1, wherein the clip complemental units are united by pressure welding incidental to application to the grooved current feed and trolley contacting wires.

4. The combination of claim 1, wherein the pre-fabricated complemental clip units are fusion united prior to application to the current feed and trolley contacting wire, and are engageable with said wires by snap action.

NORMAN LITCHFIELD.